(12) United States Patent
Simon, Jr. et al.

(10) Patent No.: US 7,222,012 B2
(45) Date of Patent: May 22, 2007

(54) AXLE TORQUE BASED POWERTRAIN BRAKING WITH RANGE SELECTION FOR COORDINATED TORQUE CONTROL (CTC)

(75) Inventors: Robert C. Simon, Jr., Novi, MI (US); Leonard G. Wozniak, Ann Arbor, MI (US); David J. Stroh, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 132 days.

(21) Appl. No.: 11/036,776

(22) Filed: Jan. 14, 2005

(65) Prior Publication Data

US 2005/0278106 A1 Dec. 15, 2005

Related U.S. Application Data

(60) Provisional application No. 60/579,838, filed on Jun. 15, 2004.

(51) Int. Cl.
*B60K 17/00* (2006.01)
*G01P 15/00* (2006.01)

(52) U.S. Cl. ............................ 701/70; 477/107; 701/54

(58) Field of Classification Search ................. 701/51, 701/53, 54, 55, 56, 70; 477/107, 108, 110, 477/101, 68, 77, 79, 89; 475/125, 153, 174
See application file for complete search history.

(56) References Cited

U.S. PATENT DOCUMENTS

| | | | | | |
|---|---|---|---|---|---|
| 4,790,606 | A | * | 12/1988 | Reinecke | 303/191 |
| 6,099,430 | A | * | 8/2000 | Winks | 475/204 |
| 6,466,851 | B2 | * | 10/2002 | Kato et al. | 701/51 |
| 6,507,780 | B2 | * | 1/2003 | Graf | 701/51 |
| 2001/0035049 | A1 | * | 11/2001 | Balch et al. | 73/488 |
| 2004/0048718 | A1 | * | 3/2004 | Tashiro | 477/175 |

* cited by examiner

*Primary Examiner*—Dalena Tran
(74) *Attorney, Agent, or Firm*—Christopher DeVries

(57) ABSTRACT

A powertrain braking system for a vehicle includes an powerplant that can be regulated to provide a desired powerplant torque and a transmission that transfers the desired powerplant torque at one of a plurality of gear ratios to provide a desired axle torque. A control module calculates an axle torque command based on a powertrain braking request and determines a shift command based on the powertrain braking request. The control module controls the powerplant based on the axle torque command and the transmission based on the shift command to achieve a desired vehicle deceleration rate that corresponds with the powertrain braking request.

33 Claims, 6 Drawing Sheets

AXLE TORQUE BASED POWERTRAIN BRAKING WITH RANGE SELECTION FOR COORDINATED TORQUE CONTROL (CTC)

CROSS-REFERENCE TO RELATED APPLICATIONS

This application claims the benefit of U.S. Provisional Application No. 60/579,838, filed on Jun. 15, 2004. The disclosure(s) of the above application is incorporated herein by reference.

FIELD OF THE INVENTION

The present invention relates to powertrain braking, and more particularly to axle torque based powertrain braking.

BACKGROUND OF THE INVENTION

Vehicles powertrains traditionally include a powerplant (e.g., internal combustion engine, electric motor and/or a combination thereof) that produces drive torque to drive a driveline. The drive torque is transferred to the driveline through a transmission such as an automatic transmission. The drive torque is transmitted through one of various gear ratios of the automatic transmission to achieve a desired axle torque. More specifically, the powerplant and transmission are regulated to provide the desired axle torque to the driveline.

The powertrain can be used to brake the vehicle. For example, the transmission can downshift and/or the powerplant can be regulated to decelerate the vehicle at varying rates. Powertrain braking can be driver initiated and/or automatic. For example, a driver can manually shift the transmission to a lower range resulting in a gear shift. Alternatively, the vehicle can detect when deceleration is required and can automatically shift the transmission to a lower range.

Traditional powertrain braking, however, can lead to a more rapid deceleration than what a driver is accustomed to or desires. As a result of too rapid a deceleration from a downshift, the driver tends to step into the throttle. This can cause the control system to hunt. More specifically, the vehicle accelerates as a result of the driver stepping into the throttle, which induces an upshift. The driver then eases off the throttle, inducing a downshift. This cycle repeats as the control system hunts for the proper balance point without actually achieving it.

SUMMARY OF THE INVENTION

Accordingly, the present invention provides a powertrain braking system for a vehicle. The powertrain braking system includes an powerplant that can be regulated to provide a desired powerplant torque and a transmission that transfers the desired powerplant torque at one of a plurality of gear ratios to provide a desired axle torque. A control module calculates an axle torque command based on a powertrain braking request and determines a shift command based on the powertrain braking request. The control module controls the powerplant based on the axle torque command and the transmission based on the shift command to achieve a desired vehicle deceleration rate that corresponds to the powertrain braking request.

In one feature, the control module generates the powertrain braking request.

In another feature, the powertrain braking system further includes a sub-module that generates the powertrain braking request.

In other features, the powertrain braking request is an absolute axle torque request based on at least on at least one of a delta torque request and an absolute torque request. The control module further determines a minimum axle torque based on a range of the transmission and converts the delta torque request into an absolute delta torque request based on the minimum axle torque.

The control module determines a scaling torque based on the powertrain braking request and an effective range torque. The axle torque command is further based on said scaling torque. The control module determines an effective range based on the scaling torque and a range of the transmission. The shift command is determined based on the effective range.

In still other features, the powertrain braking request is a delta axle torque request based on at least one of a delta torque request and an absolute torque request. The control module determines a minimum axle torque based on a range of the transmission and converts the absolute torque request into an absolute delta torque request based on the minimum axle torque. The control module further determines a driver intended torque based on the minimum axle torque. The axle torque command is further based on the driver intended torque.

In still other features, the control module determines an effective range of a transmission based on the at least one of said delta torque request and said absolute torque request. The shift command is determined based on the effective range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
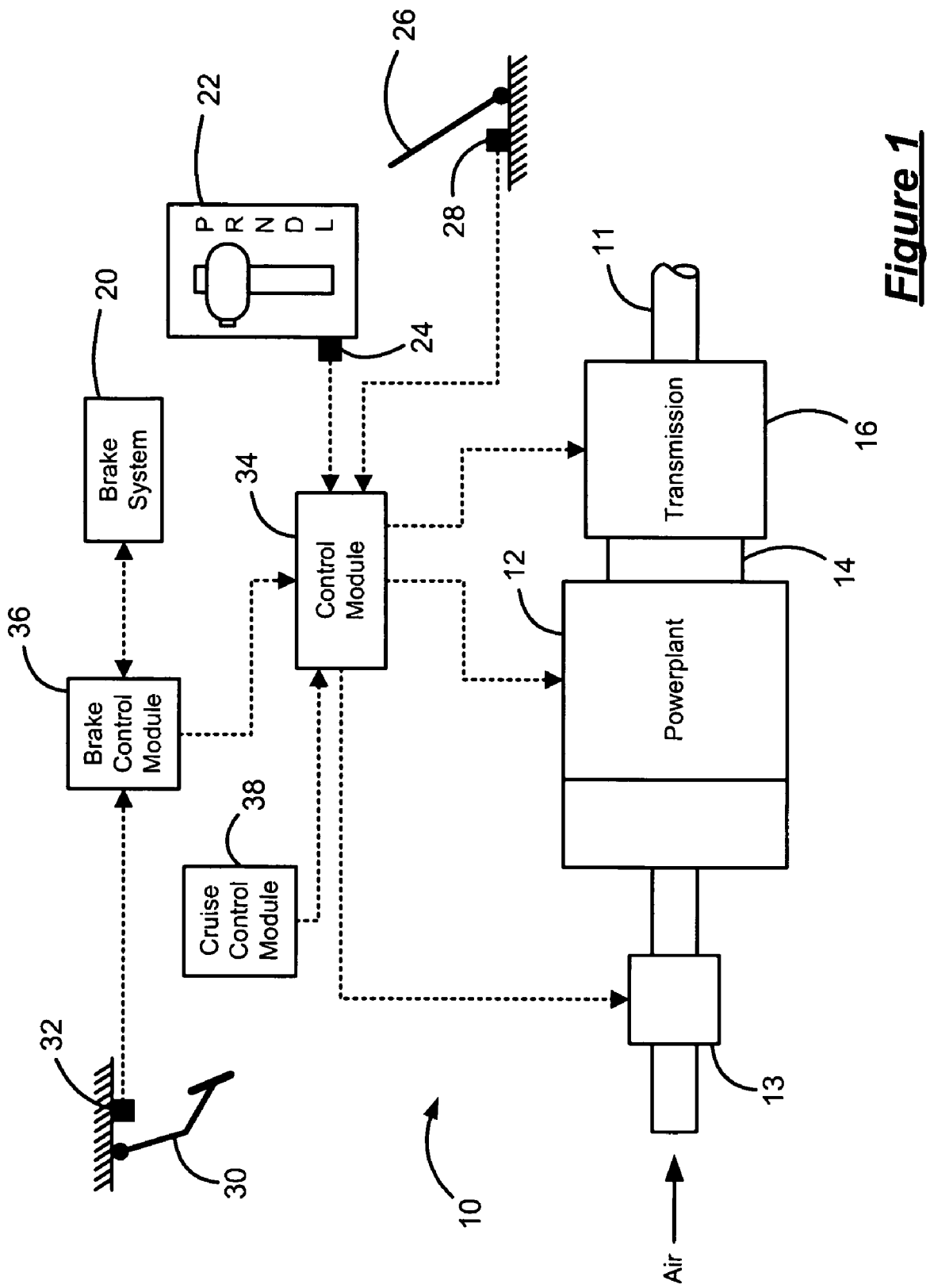
FIG. 1 is a schematic illustration of an exemplary vehicle system that is operated based on the axle torque based powertrain braking system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle system 10 includes a powerplant 12 that produces drive torque. The powerplant 12 can include an internal combustion engine that combusts an air and fuel mixture to produce drive torque. Air is drawn into the powerplant through a throttle 13. It is also anticipated that the powerplant 12 can be a hybrid powerplant including an powerplant and an electric machine. The powerplant 12 generates drive torque that is transferred through a torque converter 14 and a transmission 16 to drive a driveline 18. The transmission 16 is preferably an automatic transmission that transfers the drive torque through one of a plurality of ranges or gear ratios (e.g., 3-speed, 4-speed, 5-speed, 6-speed and the like). The gear ratio is determined based on the axle torque based powertrain braking system of the present invention. The driveline includes a brake system 20 that enables a driver to control deceleration of the vehicle, as described in further detail below.

A range selector 22 enables a driver to select an operating range of the transmission 16 including, but not limited to, a park range (P), a reverse range (R), a neutral range (N), a drive range (D) and a low drive range (L). In P, no torque is transferred through the transmission 16 and the driveline is locked to prevent movement of the vehicle. In R, torque is transferred through the transmission 16 to drive the vehicle in reverse. In N, no torque is transferred through the transmission 16 and the driveline is free to rotate, enabling the vehicle to roll without being driven. In D, torque is transferred through the transmission 16 at one of the plurality of available gear ratios to drive and/or brake the vehicle, as discussed in detail further below. In L, torque is transferred through the transmission 16 through a limited number of the plurality of available gear ratios to drive and/or brake the vehicle. A position sensor 24 is provided and is responsive to the particular range selected by the driver. The position sensor 24 generates a position signal that indicates the desired range, as explained in further detail below.

An accelerator pedal 26 is provided and is one of the inputs that enables a driver to indicate a desired axle torque. The desired axle torque indicates the driver's desired level of performance or torque output. A position sensor 28 is responsive to a position of the accelerator pedal 26. The position sensor 28 generates a position signal that indicates the desired axle torque, as explained in further detail below. A brake pedal 30 is provided and enables the driver to indicate a desired braking force of the brakes (not shown). More specifically, a position sensor 32 is responsive to a position of the brake pedal 30. The position sensor 32 generates a position signal that indicates the desired braking force, as explained in further detail below.

A control module 34 operates the powerplant 12 and the transmission 16 based on the powertrain braking control of the present invention. Other control modules can be included to operate specific systems of the vehicle. For example, a brake control module 36 can be implemented to control the braking system 20 and a cruise control module 38 can be implemented to control operation of the powerplant 12 during cruise control. Cruise control can include a normal vehicle speed target cruise control system and/or an adaptive cruise control system that adjusts vehicle speed base on the proximity of other vehicles. Although not illustrated, still other control modules include, but are not limited to, a transmission control module (TCM) and an powertrain control module (PCM). It is appreciated that although the brake control module 36 and cruise control module 38 are illustrated as separate modules, these modules can be integrated into the control module 34 as sub-modules. It is further appreciated that the multiplicity of modules and partitioning of functions therebetween can vary.

The control module 34 receives the position signals from the accelerator pedal position sensor 28 and the range selector position signal 24. The control module 34 also receives signals from the brake control module 36, the cruise control module 38 and/or any other modules or sub-modules that may be provided. The control module 34 process the various signals according to the powertrain braking control of the present invention. More specifically, the control module 34 regulates operation of the powerplant 12 and/or transmission to provide a desired deceleration 16.

The control module 34 generates an axle torque command ($T_{AXLE}$) and a shift command and respectively regulates operation of the powerplant 12 and/or the transmission 16 based thereon. More specifically, the control module 34 can regulate the throttle 13, spark advance/retard, intake and exhaust cam phasers, exhaust gas recirculation (EGR), fuel injectors, the electric machine (in the case of a hybrid powerplant) and the like based on $T_{AXLE}$ to provide the desired axle torque. Similarly, the control module 34 can initiate a downshift of the transmission 16 to provide the desired axle torque.

The axle torque based powertrain braking control of the present invention enables the powertrain to provide vehicle braking based on a delta axle torque request ($T_{DELTA}$) and/or an absolute axle torque request ($T_{ABS}$). The delta axle torque request indicates a desired change in axle torque and the absolute axle torque request indicates a desired axle torque. It is appreciated that $T_{DELTA}$ and $T_{ABS}$ can be generated by any of the control modules and/or sub-modules described herein. For example, $T_{DELTA}$ can be generated by a control module, such as the brake control module 36, to indicate a desired amount of powertrain braking to assist braking performed by the brake system 20. $T_{ABS}$ can be generated by a control module, such as the cruise control module 38 or even the control module 34, to indicate the desired axle torque.

Figure 2:
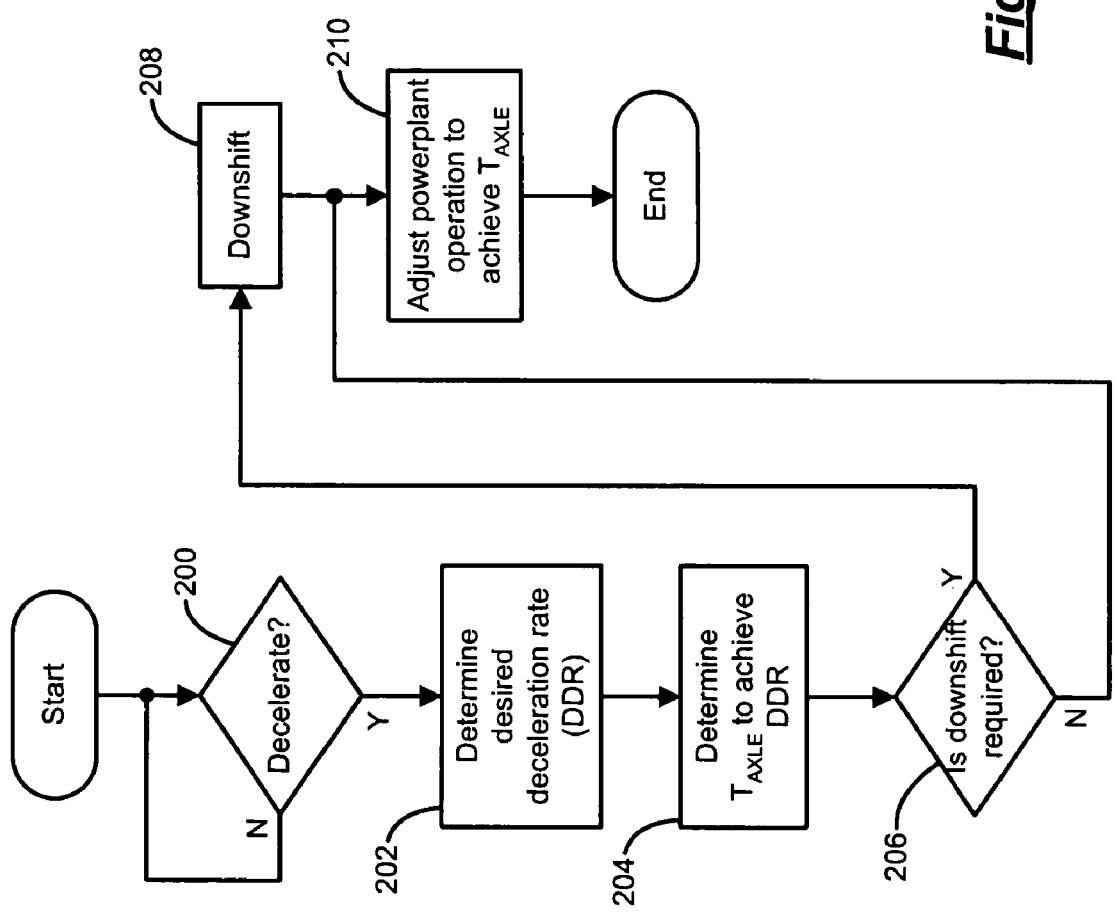
FIG. 2 is a flowchart illustrating general steps performed by the axle torque based powertrain braking system.

Referring now to FIG. 2, the general steps performed by the axle torque based powertrain braking control are illustrated. In step 200, control determines whether powertrain deceleration is desired based on $T_{DELTA}$ and/or $T_{ABS}$. If a powertrain assisted deceleration is desired, control continues in step 202. Otherwise, control loops back. In step 202, control determines the desired deceleration rate (DDR) based on $T_{DELTA}$ and/or $T_{ABS}$. Control determines $T_{AXLE}$ to achieve the DDR in step 204.

In step 206, control determines whether a transmission downshift is required to achieve $T_{AXLE}$. If a downshift is required, control continues in step 208. If a downshift is not required, control continue in step 210. In step 208, control downshifts the transmission 16 to a range that can provide $T_{AXLE}$. Control adjusts powerplant operation (i.e., powerplant torque output) to achieve $T_{AXLE}$ and control ends.

Figure 3:
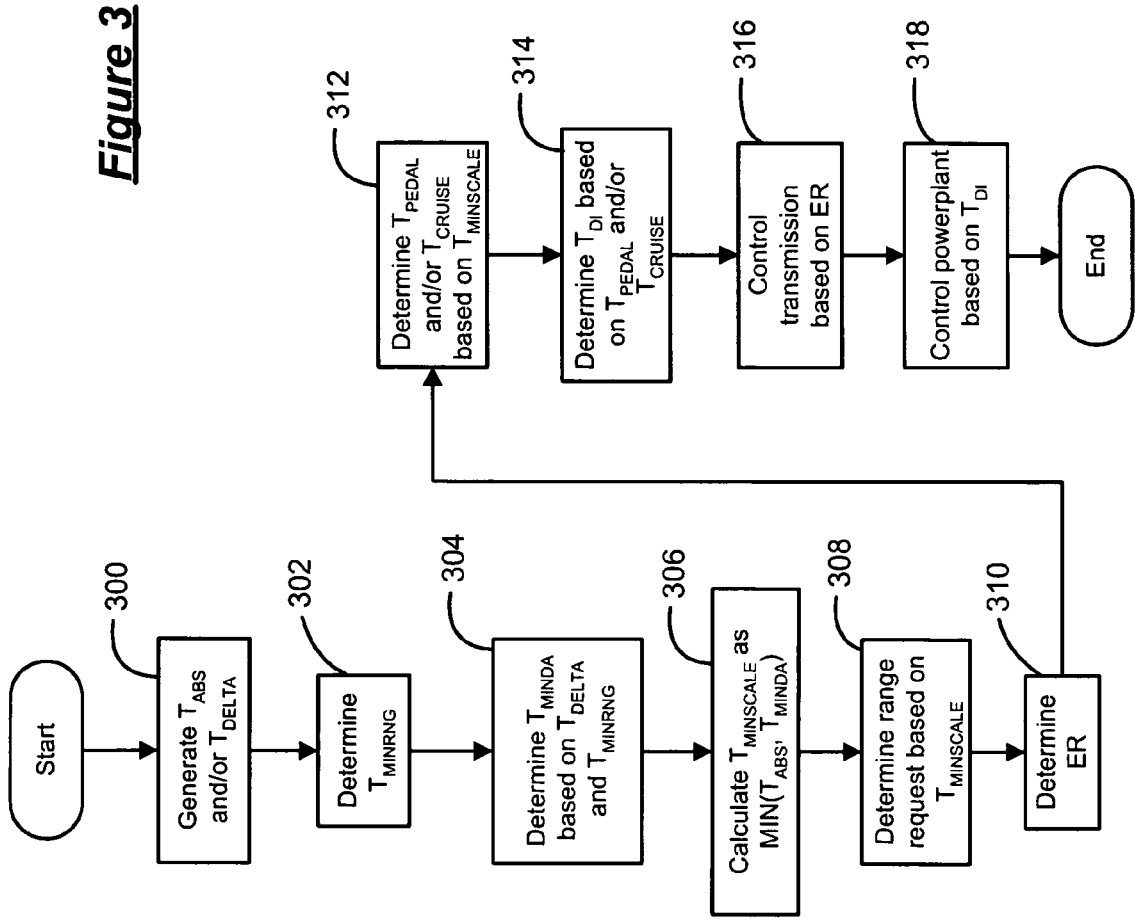
FIG. 3 is a flowchart illustrating steps performed by the axle torque based powertrain braking system to determine a driver intended axle torque according to the present invention.

Referring now to FIG. 3, the steps performed by the axle torque based powertrain braking control to determine a driver intended axle torque ($T_{DI}$) and a transmission range (TR) will be described in detail. As used herein, the term range refers to one of the PRNDL selector position, the transmission gear ratio and/or a combination thereof. In step 300, $T_{ABS}$ and $T_{DELTA}$ are generated. In step 302, a minimum range torque ($T_{MINRNG}$) is determined based on the range selector position as explained in further detail below. In step 304, a minimum delta absolute axle torque ($T_{MINDA}$) is determined based on $T_{DELTA}$ and $T_{MINRNG}$. More specifically, $T_{MINDA}$ is determined as the difference between $T_{MINRNG}$ and $T_{DELTA}$.

In step 306, a minimum scaling axle torque ($T_{MINSCALE}$) is calculated as the minimum of $T_{ABS}$ and $T_{MINAD}$. $T_{MINSCALE}$ is the desired axle torque indicated when the accelerator pedal 26 is at rest (i.e., is not depressed). In step 308, a range request is determined based on $T_{MINSCALE}$. More specifically, each transmission range or gear ratio has minimum and maximum torque values associated therewith. The range request is determined as the range where $T_{MINSCALE}$ lies between the minimum and maximum torque values for that range. In step 310, an effective transmission range (ER) is determined. ER is the range to which the transmission 16 may be shifted and is not necessarily the current transmission range (TR). ER is determined as the lowest range between the range request and the range indicated by the selector position.

In step 312, a pedal axle torque ($T_{PEDAL}$) and a cruise axle torque ($T_{CRUISE}$) are determined based on $T_{MINSCALE}$. It should be noted that if the cruise control system is not operating, $T_{CRUISE}$ is not calculated. In step 314, a driver intended axle torque ($T_{DI}$) is determined as the maximum between $T_{PEDAL}$ and $T_{CRUISE}$. The transmission 16 is controlled based on ER in step 316 and the powerplant 12 is controlled based on $T_{DI}$ in step 318. More specifically, the transmission 16 is controlled to either remain in the current range if the ER is equal to the current range or shift to the ER from the current range. The powerplant components (e.g., the throttle 13, spark advance/retard, intake and exhaust cam phasers, exhaust gas recirculation (EGR), fuel injectors, the electric machine (in the case of a hybrid powerplant) and the like) are controlled based on $T_{DI}$.

Figure 4:
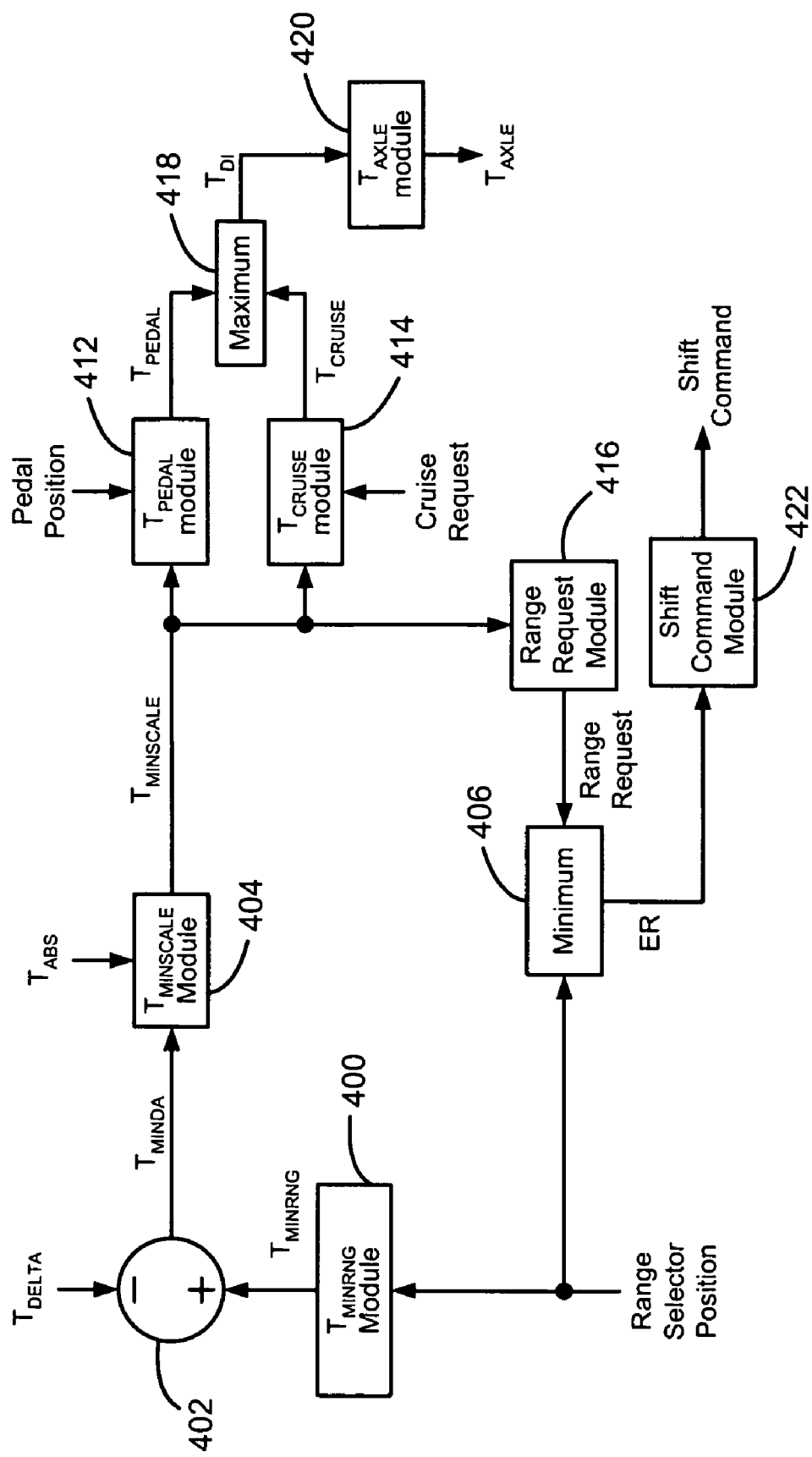
FIG. 4 is a signal flow diagram corresponding to FIG. 3.

Referring now to FIG. 4, a signal flow diagram illustrates the powertrain braking control of FIG. 3 in more detail. Inputs to the powertrain braking control include the accelerator pedal position, a cruise request, the range selector position and $T_{DELTA}$ and/or $T_{ABS}$. $T_{MINRNG}$ is determined from a $T_{MINRNG}$ module 400 based on the range selector position. More specifically, $T_{MINRNG}$ is the minimum torque achievable by the transmission 16 in the current range, which is indicated by the range selector position. The $T_{MINRNG}$ module 400 can generate a multi-dimensional, variable look-up table from which, $T_{MINRNG}$ is determined based on the range selector position and/or various other inputs.

$T_{DELTA}$ is subtracted from $T_{MINRNG}$ by a summer 402 to provide $T_{MINDA}$. In this manner, $T_{DELTA}$ is converted to an absolute axle torque value. A $T_{MINSCALE}$ module 404 determines $T_{MINSCALE}$ based on $T_{ABS}$ and $T_{MINDA}$. A range request module 416 determines a range request based on $T_{MINSCALE}$. The range request is the range where $T_{MINSCALE}$ lies between the minimum and maximum torque values for that range. The range request module 416 generates a variable look-up table similar to that described above with regard to the $T_{MINRNG}$ module, however, the look-up table is inverted (i.e., input torque to get range). A minimum function module 406 determines ER based on the range selector position and the range request, the determination of which is described in further detail below. ER is determined as the lowest range between the current range, indicated by the range selector position, and the range request.

$T_{MINSCALE}$ is fed to a $T_{PEDAL}$ module 412, a $T_{CRUISE}$ module 414 and a look-up table 416. The $T_{PEDAL}$ module 412 determines $T_{PEDAL}$, which is the control system interpretation of the driver requested axle torque as input via the accelerator pedal. The scaling of $T_{PEDAL}$ is defined by $T_{MINSCALE}$ (i.e., the minimum allowed axle torque) and a maximum axle torque. The $T_{CRUISE}$ module 414 determines $T_{CRUISE}$, which is the applicable cruise system's axle torque request required to provide the proper cruise control operation. The scaling of $T_{CRUISE}$ is defined by $T_{MINSCALE}$ (i.e., the minimum allowed axle torque) and the maximum axle torque. During periods where cruise control is inactive, $T_{CRUISE}$ is not determined.

A maximum function module 418 determines $T_{DI}$ as the maximum of $T_{PEDAL}$ and $T_{CRUISE}$. A $T_{AXLE}$ module 420 calculates $T_{AXLE}$ based on $T_{DI}$, and other vehicle inputs. Other, exemplary vehicle inputs include other axle torque requests that may be generated by other vehicle systems including, but not limited to, a stability control system. A shift command module 422 determines the shift command based on ER and other inputs. Other, exemplary inputs include gear limits that may prohibit shifting of the transmission 16 to protect powertrain components or for stability control purposes.

$T_{AXLE}$ and the shift command respectively regulate operation of the powerplant 12 and the transmission 16 to achieve the desired deceleration rate. If a downshift is commanded based on the shift command, the transmission 16 is shifted and the powerplant 12 is regulated based on $T_{AXLE}$ to achieve the desired axle torque and therefore the desired deceleration rate. In some instances, although a shift is desired it may be inhibited as a result of protection protocols. In such a case, the desired axle torque is not achievable until the shift occurs. If the transmission 16 is not shifted because the desired axle torque can be achieved in the current range, the powerplant 12 is regulated based on $T_{AXLE}$ to achieve the desired axle torque and therefore the desired deceleration rate.

Figure 5:
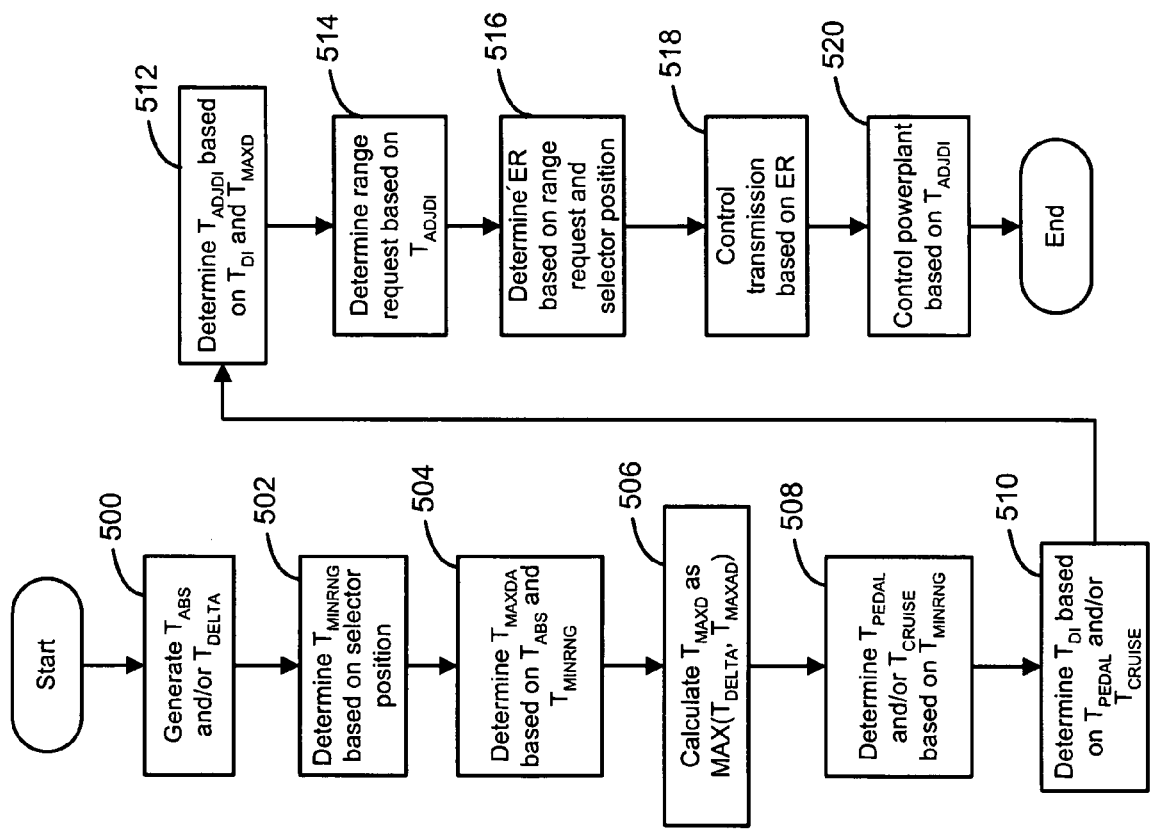
FIG. 5 is a flowchart illustrating alternative performed by the axle torque based powertrain braking system to determine a driver intended axle torque according to the present invention.

Referring now to FIG. 5, alternative steps performed by the axle torque based powertrain braking system to determine $T_{DI}$, and a transmission range (TR) will be described in detail. In step 500, $T_{ABS}$ and $T_{DELTA}$ are generated. In step 502, $T_{MINRNG}$ is determined based on the range selector position. A maximum absolute delta axle torque ($T_{MAXAD}$) is determined based on $T_{ABS}$ and $T_{MINRNG}$ in step 504. In step 506, a maximum delta brake torque ($T_{MAXD}$) is calculated as the maximum of $T_{DELTA}$ and $T_{MAXAD}$.

In step 508, $T_{PEDAL}$ and $T_{CRUISE}$ are determined based on $T_{MINRNG}$, a maximum range torque ($T_{MAXRNG}$) and pedal or cruise errors. $T_{DI}$ is determined based on $T_{PEDAL}$ and $T_{CRUISE}$ in step 510. More specifically, $T_{DI}$ is calculated as the maximum of $T_{PEDAL}$ and $T_{CRUISE}$. As discussed above, $T_{CRUISE}$ is not determined during periods where cruise control is inactive. In step 512, an adjusted $T_{DI}$ ($T_{ADJDI}$) is determined based on $T_{DI}$ and $T_{MAXD}$. In step 514, the range request is determined based on $T_{ADJDI}$ and is the range required to achieve $T_{ADJDI}$. ER is determined in step 516 based on the range selector position and the range request.

The transmission 16 is controlled based on ER in step 518 and the powerplant 12 is controlled based on $T_{ADJDI}$ in step 520. More specifically, the transmission 16 is controlled to either remain in the current range if the ER is equal to the current range or shift to the ER from the current range. The powerplant components (e.g., the throttle 13, spark advance/retard, intake and exhaust cam phasers, exhaust gas recirculation (EGR), fuel injectors, the electric machine (in the case of a hybrid powerplant) and the like) are controlled based on $T_{ADJDI}$.

Figure 6:
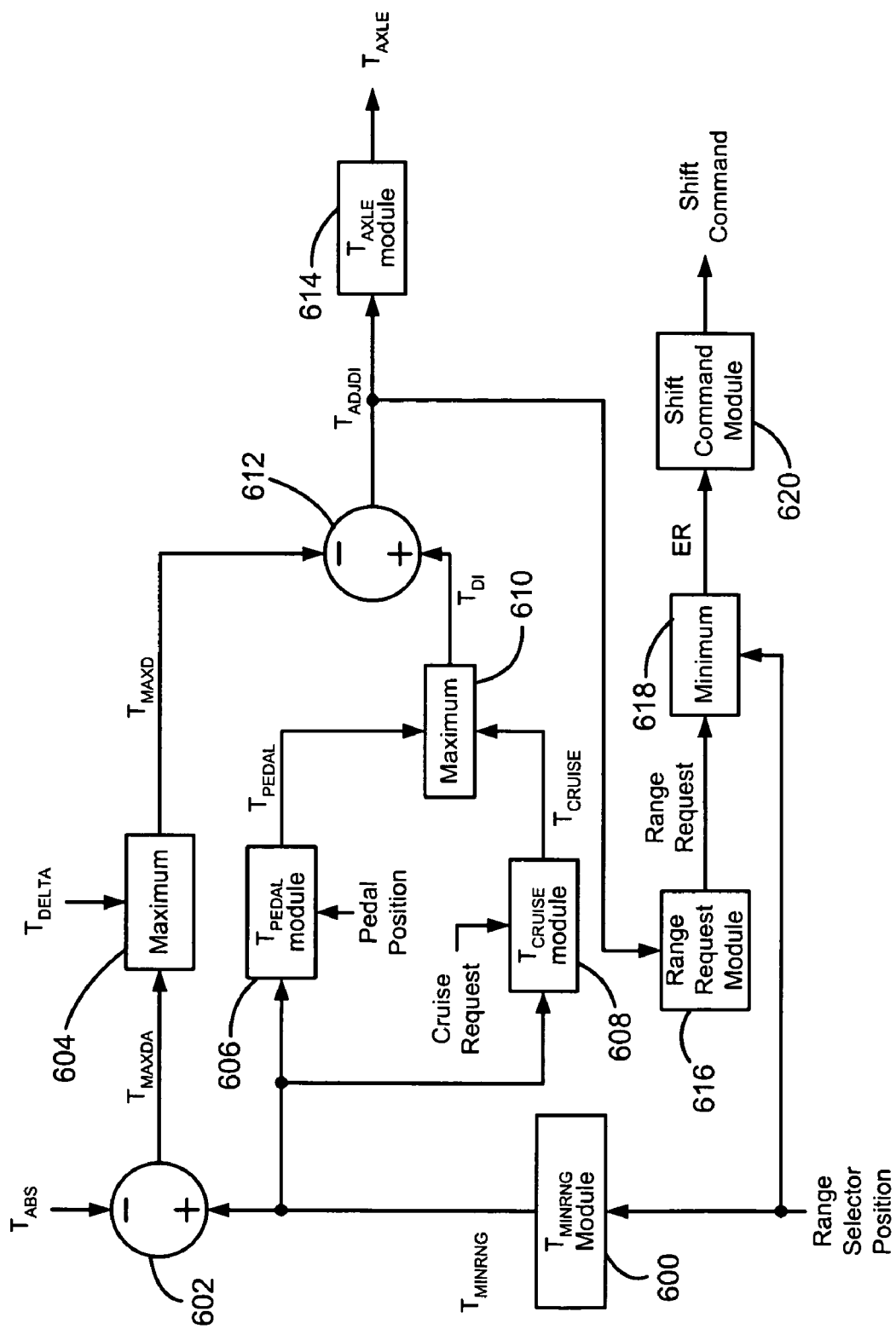
FIG. 6 is a signal flow diagram corresponding to FIG. 5.

Referring now to FIG. 6, a signal flow diagram illustrates the powertrain braking control of FIG. 5 in more detail. Inputs to the powertrain braking control include the range selector position and $T_{DELTA}$ and/or $T_{ABS}$. $T_{MINRNG}$ is determined from a $T_{MINRNG}$ module 600 based on the range selector position. It is appreciated that additional inputs can be used to determine $T_{MINRNG}$. $T_{MINRNG}$ is the minimum axle torque allowed to be commanded in the current range, which is indicated by the range selector position. The $T_{MINRNG}$ module 600 can generate a multi-dimensional, variable look-up table from which, $T_{MINRNG}$ is determined based on the range selector position and/or various other inputs.

$T_{ABS}$ is subtracted from $T_{MINRNG}$ by a summer 602 to provide $T_{MAXDA}$. In this manner, $T_{ABS}$ is converted to a delta torque value. A maximum function module 604 determines $T_{MAXD}$ based on the maximum value of $T_{DELTA}$ and $T_{MAXAD}$. The $T_{PEDAL}$ module 606 determines $T_{PEDAL}$ and the $T_{CRUISE}$ module 608 determines $T_{CRUISE}$ using $T_{MINRNG}$ as the minimum allowed value. During periods where cruise control is inactive, $T_{CRUISE}$ is not determined. A maximum function module 610 determines $T_{DI}$ as the maximum of $T_{PEDAL}$ and $T_{CRUISE}$. A summer 612 calculates $T_{ADJDI}$ based on $T_{DI}$ and $T_{MAXD}$. $T_{ADJDI}$ is provided to a $T_{AXLE}$ module 614 and a range request module 616.

The range request is determined by the range request module 616 based on $T_{ADJDI}$. More specifically, the range request is the range where $T_{ADJDI}$ lies between the minimum and maximum torque values for that range. The range request module 616 generates a variable look-up table similar to that described above with regard to the $T_{MINRNG}$ module, however, the look-up table is inverted (i.e., input torque to get range). A minimum function module 618 determines ER based on the range selector position and the range request. More specifically, ER is determined as the lowest range between the current range, indicated by the range selector position, and the range request. ER is provided to a shift command module 620.

The $T_{AXLE}$ module 614 calculates $T_{AXLE}$ based on $T_{ADJDI}$ and other vehicle inputs. Other, exemplary vehicle inputs include other axle torque requests that may be generated by other vehicle systems including, but not limited to, a stability control system. The shift command module 620 determines the shift command based on ER and other inputs. Other, exemplary inputs include gear limits that may prohibit shifting of the transmission to protect transmission components or for stability control purposes.

If a downshift is commanded based on the shift command, the transmission 16 is shifted and the powerplant 12 is regulated based on $T_{AXLE}$ to achieve the desired axle torque and therefore the desired deceleration rate. In some instances, although a shift is desired it may be inhibited as a result of protection protocols. In such a case, the desired axle torque is not achievable until the shift occurs. If the transmission 16 is not shifted because the desired axle torque can be achieved in the current range, the powerplant 12 is regulated based on $T_{AXLE}$ to achieve the desired axle torque and therefore the desired deceleration rate.

The powertrain braking control system of the present invention can be implemented to provide powertrain braking at the request of various sub-systems. Exemplary sub-systems include, but are not limited to, the braking system 20, an auto-grade braking system, a cruise control system and an adaptive cruise control system. In general, one or more of the sub-systems provides $T_{DELTA}$ and/or $T_{ABS}$. As discussed in detail above, the powertrain braking control arbitrates between $T_{DELTA}$ and $T_{ABS}$ when both are generated by different sub-systems. It is further anticipated that the powertrain braking control system arbitrates between multiple $T_{DELTA}$'s and $T_{ABS}$'s that may be generated by single or multiple modules. In the case of multiple $T_{DELTA}$'s, the powertrain braking control system uses the maximum $T_{DELTA}$ value. In the case of multiple $T_{ABS}$'s, the powertrain braking control system uses the minimum $T_{ABS}$ value.

The braking system 20 can request braking assistance using powertrain braking. For example, on downhill grades a driver may over-use the brakes, which can result in over-heating and damage to brake components. The brake control module can monitor brake usage and request powertrain braking assistance by generating a $T_{DELTA}$. By supplementing the braking effort with powertrain braking, over-heating can be prevented and the life of the brake components can be extended. Similarly, an auto-grade braking system can generate a $T_{ABS}$ in the event that the vehicle continues to accelerate on a downhill grade. In this manner, the powertrain braking control system enables a driver to maintain speed and prevent acceleration when driving downhill.

A cruise control system can implement the powertrain braking control system to control vehicle deceleration. More specifically, if the cruise control system detects that the vehicle speed is over a set point, the cruise control system can generate a $T_{ABS}$ to decelerate the vehicle speed to achieve the set point. Similarly, an adaptive cruise control system can implement the powertrain braking control system to brake the vehicle. More specifically, adaptive cruise control systems monitor a vehicle's distance from another vehicle. If the vehicle is too close to the other vehicle, the adaptive cruise control system traditionally reduces throttle to decelerate the vehicle, maintaining a safe distance. The throttle deceleration can be supplemented or assisted by powertrain braking. For example, if the other vehicle decelerates rapidly, the adaptive cruise control system can generate a $T_{ABS}$ to correspondingly decelerate the vehicle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A powertrain braking system for a vehicle, comprising:
an powerplant that is regulated to provide a desired powerplant torque;
a transmission that transfers said desired powerplant torque at one of a plurality of gear ratios to provide a desired axle torque; and
a control module that calculates an axle torque command based on a powertrain braking request, that determines a shift command based on said powertrain braking request and that controls said powerplant based on said axle torque command and said transmission based on said shift command to achieve a desired deceleration of said vehicle that corresponds to said powertrain braking request, wherein said powertrain braking request includes an absolute axle torque request based on at least one of a delta torque request and an absolute torque request, and wherein said control module further determines a minimum axle torque based on a range of said transmission and converts said delta torque request into an absolute delta torque request based on said minimum axle torque.

2. The powertrain braking system of claim 1 wherein said control module generates said powertrain braking request.

3. The powertrain braking system of claim 1 further comprising a sub module that generates said powertrain braking request.

4. The powertrain braking system of claim 1 wherein said control module determines a scaling torque based on said powertrain braking request and an effective range torque.

5. The powertrain braking system of claim 4 wherein said axle torque command is further based on said scaling torque.

6. The powertrain braking system of claim 4 wherein said control module determines an effective range based on said scaling torque and a range of said transmission.

7. The powertrain braking system of claim 6 wherein said shift command is determined based on said effective range.

8. The powertrain braking system of claim 1 wherein said powertrain braking request further includes a delta axle torque request based on at least one of a delta torque request and an absolute torque request.

9. The powertrain braking system of claim 8 wherein said control module determines a minimum axle torque based on a range of said transmission and converts said absolute torque request into an absolute delta torque request based on said axle transmission torque.

10. The powertrain braking system of claim 9 further comprising determining a driver intended torque based on said minimum axle torque.

11. The powertrain braking system of claim 10 wherein said axle torque command is further based on said driver intended torque.

12. The powertrain braking system of claim 8 further comprising determining an effective range of a transmission based on said at least one of said delta torque request and said absolute torque request.

13. The method of claim 12 wherein said shift command is determined based on said effective range.

14. A method of controlling a vehicle powertrain to decelerate a vehicle at a desired rate, comprising:
generating a powertrain braking request;
calculating an axle torque command based on said powertrain braking request;
determining a shift command based on said powertrain braking request;
controlling an powerplant based on said axle torque command and a transmission based on said shift command to achieve a desired deceleration of said vehicle that corresponds to said powertrain braking request, wherein said powertrain braking request includes an absolute axle torque request based on at least on at least one of a delta torque request and an absolute torque request;
determining a minimum axle torque based on a range of a transmission; and
converting said delta torque request into an absolute delta torque request based on said minimum axle torque.

15. The method of claim 14 further comprising determining a scaling torque based on said powertrain braking request and an effective range torque.

16. The method of claim 15 wherein said axle torque command is further based on said scaling torque.

17. The method of claim 15 further comprising determining an effective range based on said scaling torque and a range of a transmission.

18. The method of claim 15 wherein said shift command is determined based on said effective range.

19. The method of claim 15 wherein said powertrain braking request further includes a delta axle torque request based on at least one of a delta torque request and an absolute torque request.

20. The method of claim 19 further comprising:
determining a minimum axle torque based on a range of a transmission; and
converting said absolute torque request into an absolute delta torque request based on said minimum axle torque.

21. The method of claim 20 further comprising determining a driver intended torque based on said minimum axle torque.

22. The method of claim 21 wherein said axle torque command is further based on said driver intended torque.

23. The method of claim 19 further comprising determining an effective range of a transmission based on said at least one of said delta torque request and said absolute torque request.

24. The method of claim 23 wherein said shift command is determined based on said effective range.

25. A method of controlling a vehicle powertrain to decelerate a vehicle at a desired rate, comprising:
generating at least one of an absolute axle torque request and a delta axle torque request;
calculating an axle torque command based on one of said absolute axle torque request and said delta axle torque request;
determining a shift command based on said one of said absolute axle torque request and said delta axle torque request; and
controlling an powerplant based on said axle torque command and a transmission based on said shift command to achieve said desired rate;
determining a minimum axle torque based on a range of a transmission; and
converting said at least one of said absolute axle torque request and said delta torque request into an absolute delta torque request based on said minimum axle torque when said delta torque request is generated.

26. The method of claim 25 further comprising determining a scaling torque based on said one of said absolute axle torque request and said delta axle torque request and an effective range torque.

27. The method of claim 26 wherein said axle torque command is further based on said scaling torque.

28. The method of claim 26 further comprising determining an effective range based on said scaling torque and a range of a transmission.

29. The method of claim 26 wherein said shift command is determined based on said effective range.

30. The method of claim 25 further comprising determining a driver intended torque based on said minimum axle torque.

31. The method of claim 30 wherein said axle torque command is further based on said driver intended torque.

32. The method of claim 25 further comprising determining an effective range of a transmission based on said at least one of said delta torque request and said absolute delta torque request.

33. The method of claim 32 wherein said shift command is determined based on said effective range.

* * * * *